United States Patent
Okuyama et al.

(10) Patent No.: US 10,708,821 B2
(45) Date of Patent: Jul. 7, 2020

(54) MANAGEMENT APPARATUS

(71) Applicant: NTT DOCOMO, INC., Tokyo (JP)

(72) Inventors: Tatsuki Okuyama, Tokyo (JP); Satoshi Suyama, Tokyo (JP); Tatsunori Obara, Tokyo (JP); Yukihiko Okumura, Tokyo (JP)

(73) Assignee: NTT DOCOMO, INC., Tokyo (JP)

( * ) Notice: Subject to any disclaimer, the term of this patent is extended or adjusted under 35 U.S.C. 154(b) by 0 days.

(21) Appl. No.: 16/082,786

(22) PCT Filed: Feb. 16, 2017

(86) PCT No.: PCT/JP2017/005654
§ 371 (c)(1),
(2) Date: Sep. 6, 2018

(87) PCT Pub. No.: WO2017/154504
PCT Pub. Date: Sep. 14, 2017

(65) Prior Publication Data
US 2019/0082354 A1  Mar. 14, 2019

(30) Foreign Application Priority Data
Mar. 11, 2016  (JP) .................................. 2016-048753

(51) Int. Cl.
*H04W 4/00* (2018.01)
*H04W 28/16* (2009.01)
(Continued)

(52) U.S. Cl.
CPC ........... *H04W 28/16* (2013.01); *H04L 5/0048* (2013.01); *H04L 5/0073* (2013.01);
(Continued)

(58) Field of Classification Search
CPC .......... H04W 72/042; H04W 72/0446; H04W 76/27
See application file for complete search history.

(56) References Cited

U.S. PATENT DOCUMENTS 9,155,090 B2  10/2015  Moon et al.
2004/0218577 A1*  11/2004  Nguyen ............... H04B 7/2656
  370/347
(Continued)

FOREIGN PATENT DOCUMENTS

JP  2003070053 A  3/2003
JP  2011519538 A  7/2011
(Continued)

OTHER PUBLICATIONS

International Search Report issued in PCT/JP2017/005654 dated May 16, 2017 (7 pages).
(Continued)

*Primary Examiner* — Atique Ahmed
(74) *Attorney, Agent, or Firm* — Osha Liang LLP

(57) ABSTRACT

A management apparatus in a wireless communication system including multiple transmission points transmitting reference signals, the management apparatus managing the transmission points, and a mobile station, includes: a management unit for managing first and second clusters generated by grouping one or more transmission points used to communicate with the mobile station among the multiple transmission points; and a control unit for controlling allocation of the reference signals transmitted from the multiple transmission points in the first and second clusters. The management unit detects that multiple cells formed by the transmission points in the first cluster overlap some of multiple cells formed by the transmission points in the second cluster. When the management unit detects the overlap, the control unit allocates the orthogonal reference signals to the multiple cells formed by the transmission points in the first cluster and the multiple cells formed by the transmission points in the second cluster.

8 Claims, 14 Drawing Sheets

(51) Int. Cl.
  *H04L 5/00* (2006.01)
  *H04W 24/02* (2009.01)
  *H04W 16/24* (2009.01)
  *H04J 11/00* (2006.01)

(52) U.S. Cl.
  CPC ........... *H04L 5/0085* (2013.01); *H04W 16/24* (2013.01); *H04W 24/02* (2013.01); *H04J 11/0053* (2013.01); *H04L 5/0007* (2013.01)

(56) References Cited

U.S. PATENT DOCUMENTS

| | | | |
|---|---|---|---|
| 2010/0099428 A1 | 4/2010 | Bhushan et al. | |
| 2010/0099449 A1 | 4/2010 | Borran et al. | |
| 2011/0128889 A1* | 6/2011 | Liao | H04L 41/0893 370/255 |
| 2011/0199986 A1* | 8/2011 | Fong | H04L 5/0035 370/329 |
| 2013/0053046 A1* | 2/2013 | Cherubini | H04W 24/04 455/446 |
| 2013/0225189 A1* | 8/2013 | Moon | H04W 72/042 455/452.1 |
| 2015/0078259 A1* | 3/2015 | Junior | H04W 72/1215 370/329 |
| 2015/0373572 A1* | 12/2015 | Sahin | H04W 72/1231 370/252 |
| 2016/0013921 A1* | 1/2016 | Nagata | H04W 16/10 370/330 |

FOREIGN PATENT DOCUMENTS

| | | |
|---|---|---|
| JP | 2013519337 A | 5/2013 |
| JP | 2014-165506 A | 9/2014 |

OTHER PUBLICATIONS

Written Opinion issued in PCT/JP2017/005654 dated May 16, 2017 (3 pages).

Office Action issued in the counterpart Japanese Patent Application No: 2016048753, dated Jun. 11, 2019 (5 pages).

* cited by examiner

DISTRIBUTED ARRANGEMENT EXAMPLE ASSUMED IN 4G

IMPROVEMENT IN RECEPTION POWER AT CELL EDGE

CLUSTERS OVERLAP

FIG.7A

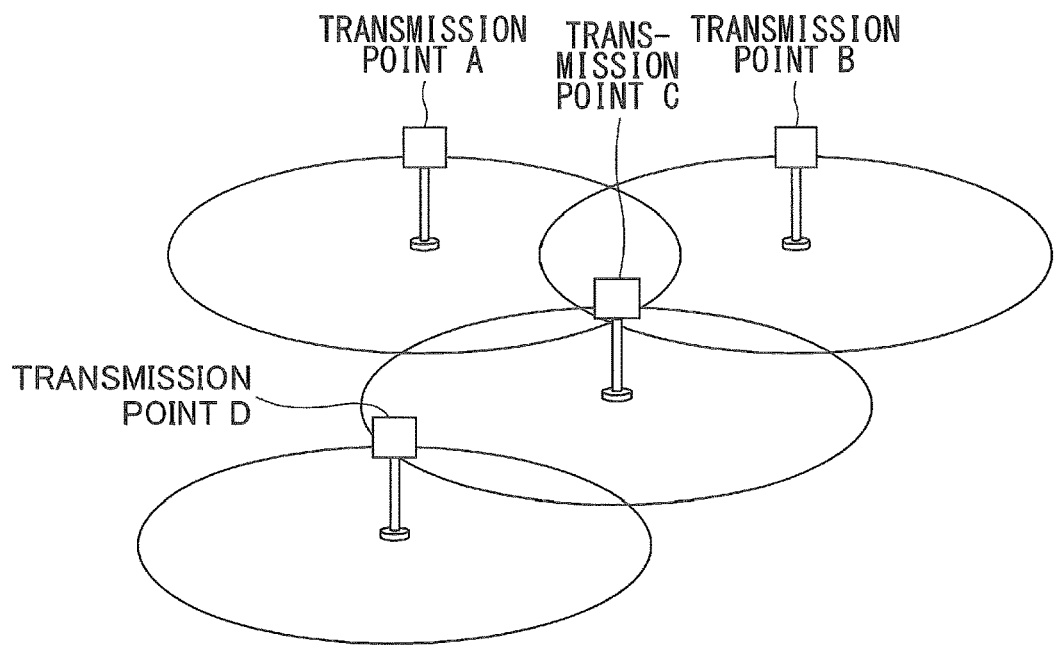

FIG.7B

CELL MANAGEMENT INFORMATION

| TRANSMISSION POINT | TRANSMISSION POINTS WHOSE CELLS OVERLAP THE CELL OF INTEREST |
|---|---|
| TRANSMISSION POINT A | TRANSMISSION POINT B, TRANSMISSION POINT C |
| TRANSMISSION POINT B | TRANSMISSION POINT A, TRANSMISSION POINT C |
| TRANSMISSION POINT C | TRANSMISSION POINT A, TRANSMISSION POINT B, TRANSMISSION POINT D |
| TRANSMISSION POINT D | TRANSMISSION POINT C |
| ⋮ | ⋮ |

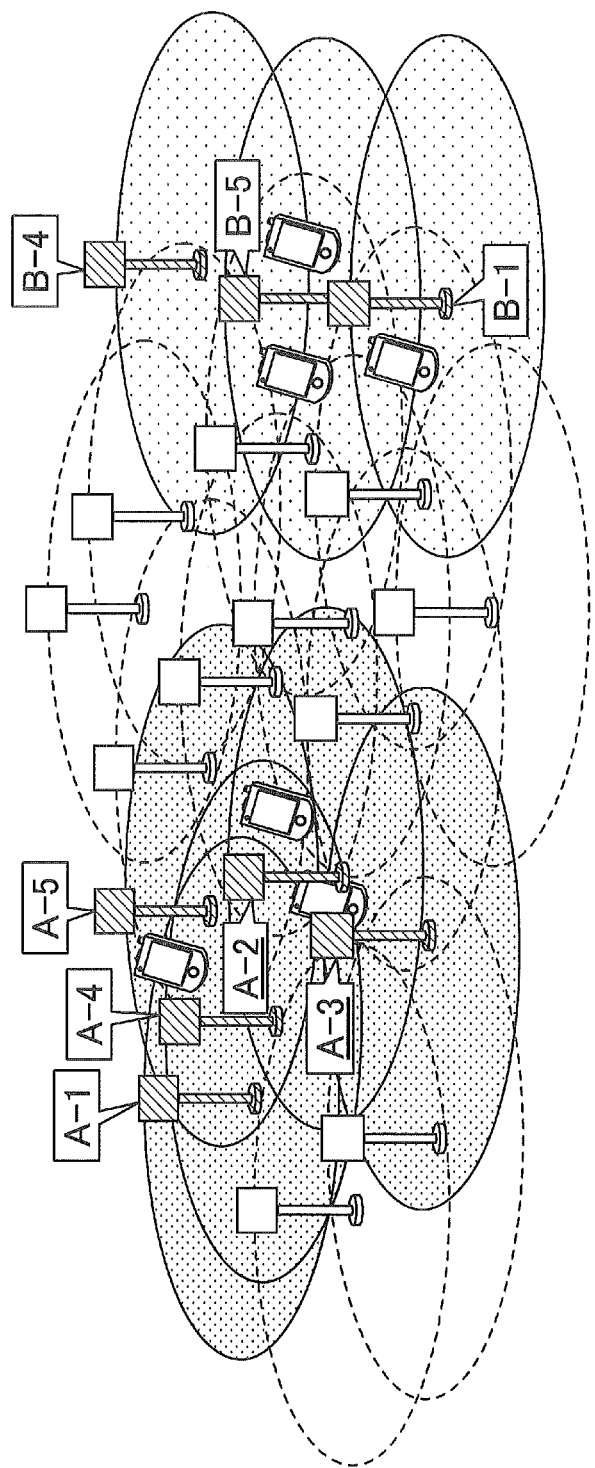

MANAGEMENT APPARATUS

TECHNICAL FIELD

The present invention relates to a management apparatus.

BACKGROUND ART

In long term evolution (LTE), various wireless technologies have been discussed to realize larger capacity of systems, further acceleration of data transmission speeds, further low delay of wireless sections, and the like.

In LTE, a technology referred to as coordinated multipoint (CoMP) in which a plurality of base stations cooperate to be able to transmit and receive wireless signals is realized. In CoMP, when a plurality of base stations cooperate to transmit and receive downlink signals, it is possible to improve reception quality at a cell edge at which a plurality of cells overlap each other. An example of cooperation transmission in LTE is illustrated in FIG. 1.

CITATION LIST

Patent Document

Patent Document 1: JP 2014-165506 A

SUMMARY OF THE INVENTION

Problem to be Solved by the Invention

Here, when a very high density distributed antenna system in which many base stations are distributed at very high density, many cells are overlapped, and many base stations cooperate to transmit and receive wireless signals can be constructed, a system capacity is considered to be further increased. With an increase in the system capacity, many terminals are considered to be accommodated within an area. An example of the very high density distributed antenna system is illustrated in FIG. 2.

However, to realize MIMO transmission in a very high density distributed antenna system in which many base stations are disposed at very high density, it is necessary to transmit orthogonal reference signals from antenna elements (hereinafter referred to as "transmission points") included in each base station. However, when orthogonal reference signals are allocated in advance to all the transmission points, the number of reference signals to be prepared is vast, and thus the allocation of the orthogonal reference signals to all the transmission points is not realistic.

On the other hand, positions at which mobile stations are located are assumed to be biased to some extent in a very high density distributed antenna system. Accordingly, it is considered that reference signals are used and shared between the cluster by grouping a plurality of transmission points used for communication by mobile stations to generate cluster and allocating reference signals so that reference signals be orthogonal in the cluster.

FIG. 3 is a diagram for describing an example of a cluster. In a state illustrated in the example of FIG. 3, cells formed by transmission points of a cluster A do not overlap cells formed by transmission points of a cluster B. Therefore, interference does not occur even when reference signals allocated to the transmission points of the cluster A overlap the reference signals allocated to the transmission points of the cluster B.

However, there is a possibility of cells between a plurality of clusters (cells formed by transmission points in clusters) overlapping when the clusters are reconstructed with movement or the like of mobile stations. For example, as illustrated in FIG. 4, when clusters are reconstructed with movement of mobile stations, some of cells of clusters A and B may overlap each other. In such a state, there is a possibility of reference signals interfered in the overlap portion, and thus the mobile stations may not perform communication.

The technology of the disclosure is devised in view of the forgoing circumstance and an object of the invention is to provide a technology capable of suppressing interference of reference signals in a wireless communication system including a plurality of transmission points.

Means for Solving Problem

According to the technology of the disclosure, there is provided a management apparatus in a wireless communication system that includes a plurality of transmission points transmitting reference signals, the management apparatus managing the plurality of transmission points, and a mobile station. The management apparatus includes: a management unit configured to manage first and second clusters generated by grouping one or more transmission points used to communicate with the mobile station among the plurality of transmission points; and a control unit configured to control allocation of the reference signals transmitted from the plurality of transmission points in the first and second clusters. The management unit detects that a plurality of cells formed by the transmission points in the first cluster overlap some of a plurality of cells formed by the transmission points in the second cluster. When the management unit detects the overlap, the control unit allocates the orthogonal reference signals to the plurality of cells formed by the transmission points in the first cluster and the plurality of cells formed by the transmission points in the second cluster.

Effect of the Invention

The technology of the disclosure provides a technology capable of suppressing interference of reference signals in a wireless communication system including a plurality of transmission points.

BRIEF DESCRIPTION OF DRAWINGS

FIG. 7A is a diagram illustrating an example of cell management information;

FIG. 7B is a diagram illustrating an example of cell management information;

FIG. 9B is a diagram for describing an example (part 1) of a processing procedure;

MODE(S) FOR CARRYING OUT THE INVENTION

Hereinafter, embodiments of the invention will be described with reference to the drawings. The embodiments to be described below are merely examples and embodiments to which the invention is applied are not limited to the following embodiments. For example, a wireless communication system according to the embodiments is assumed to be a system of a scheme conforming to LTE. However, the invention is not limited to LTE, but other schemes can also be applied.

<System Configuration>

Figure 1:
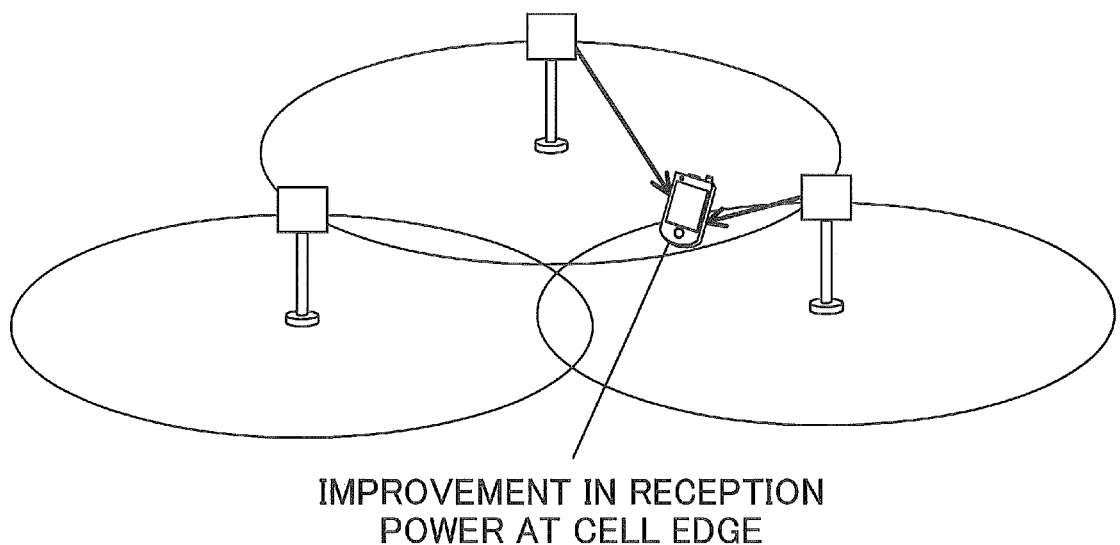
FIG. 1 is a diagram illustrating an example of cooperation transmission in LTE.
Figure 2:
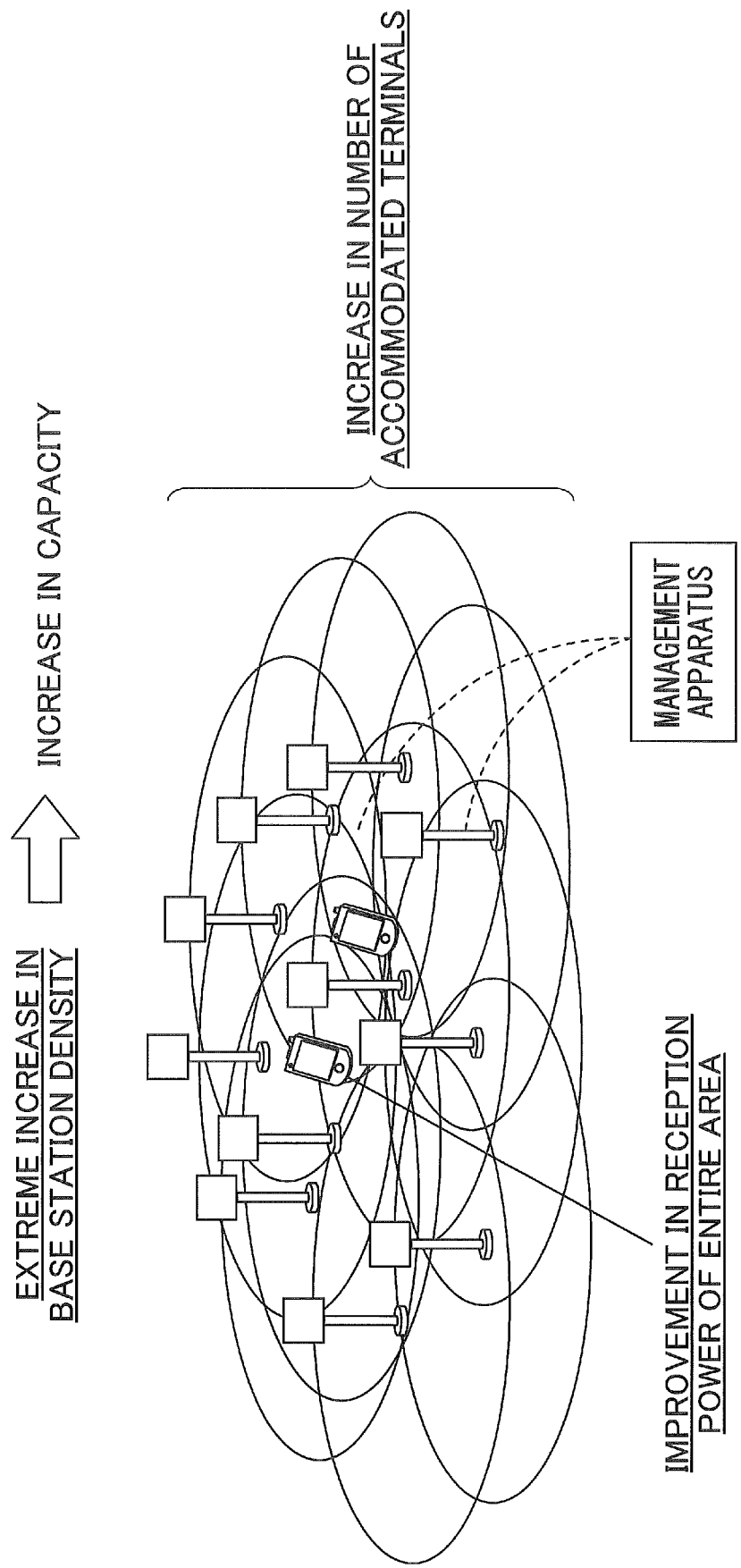
FIG. 2 is a diagram illustrating an example of a very high density distributed antenna system.
Figure 3:
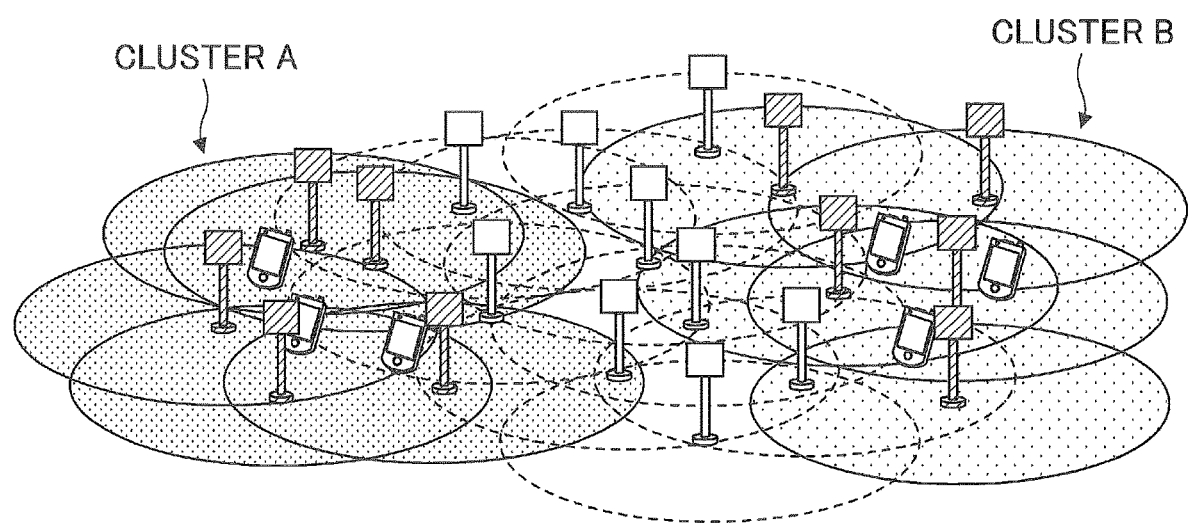
FIG. 3 is a diagram for describing an example of a cluster.
Figure 4:
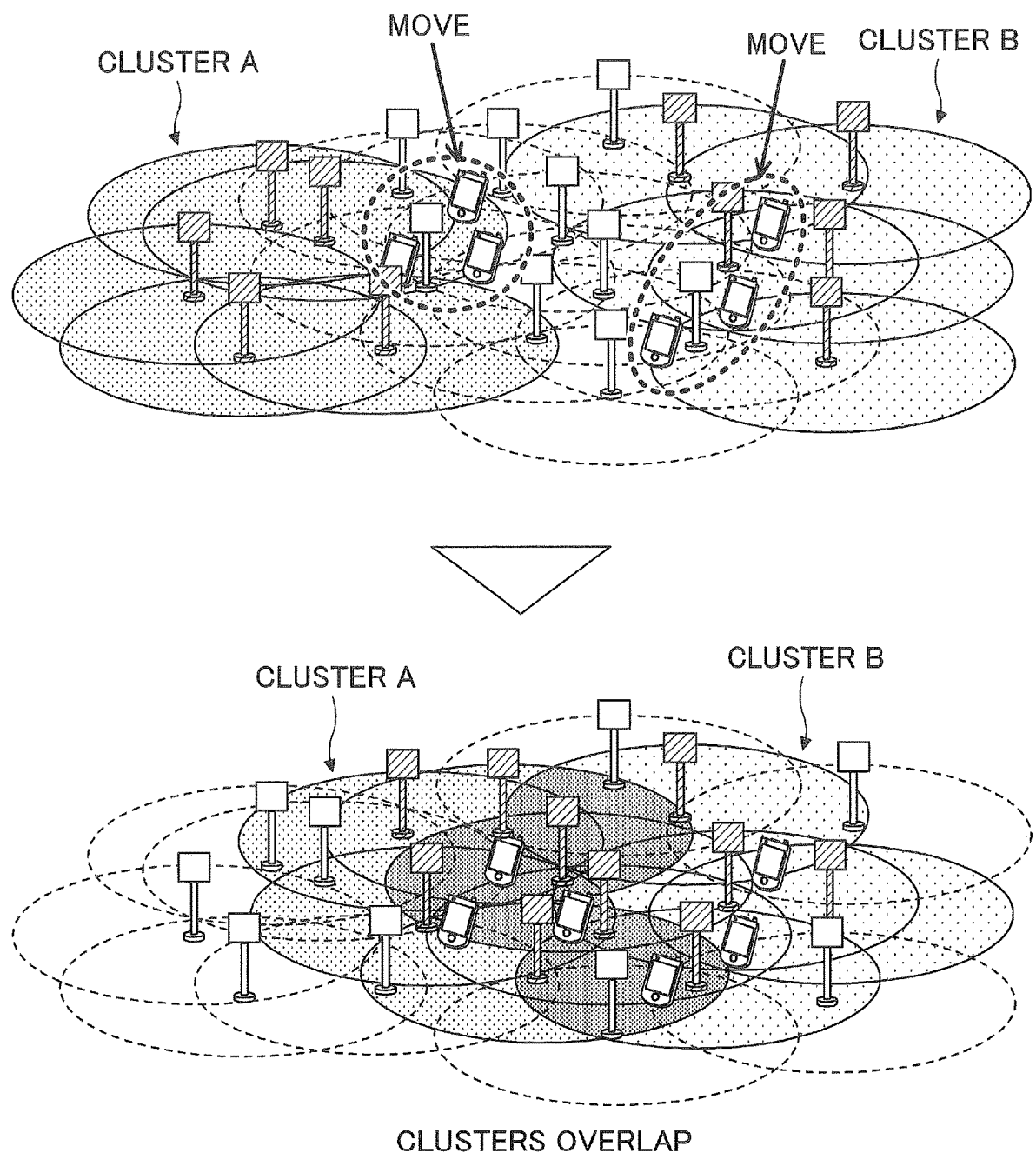
FIG. 4 is a diagram for describing a problem.
Figure 5:
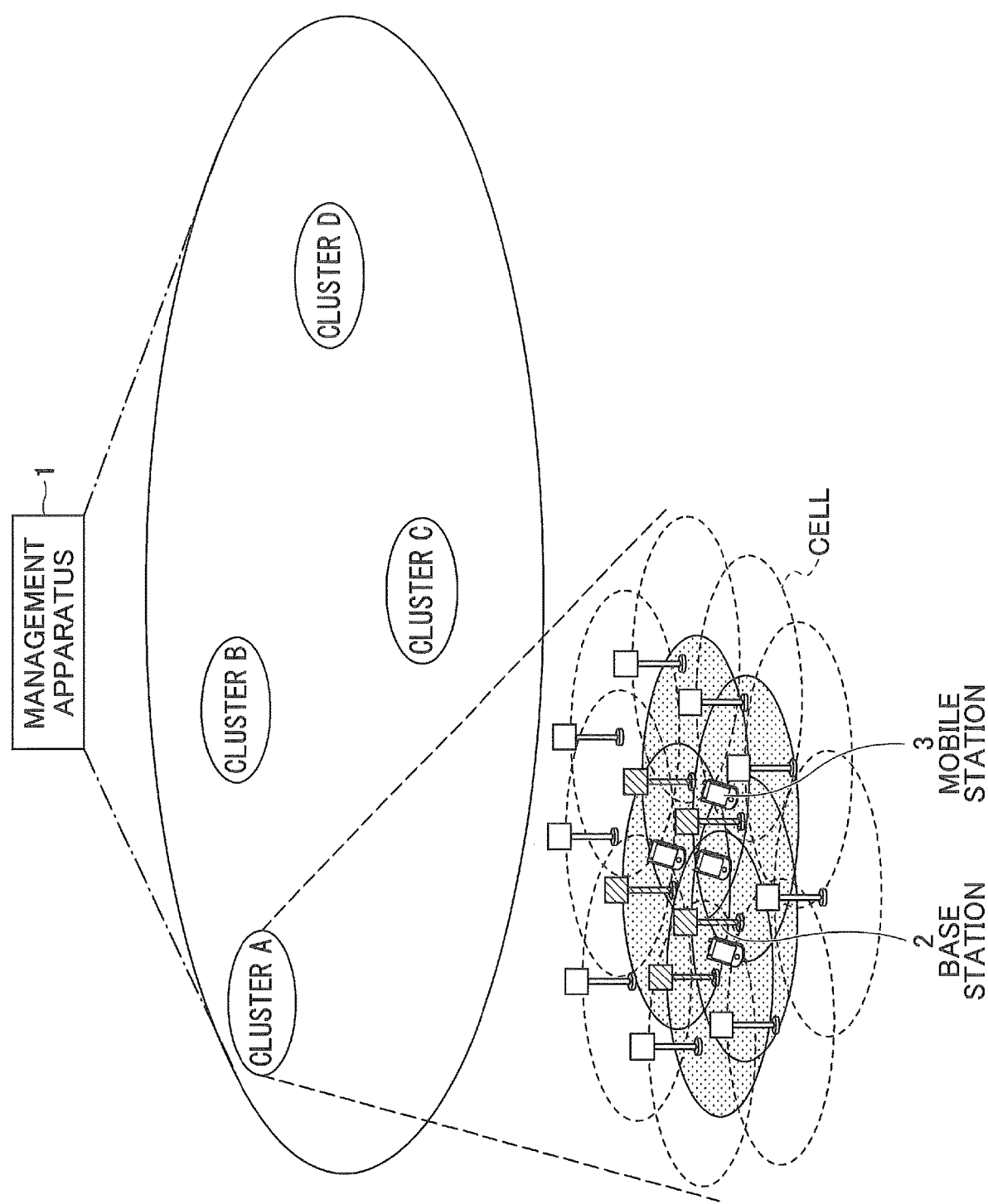
FIG. 5 is a diagram illustrating a configuration example of a wireless communication system according to an embodiment.

FIG. 5 is a diagram illustrating a configuration example of a wireless communication system according to an embodiment. The wireless communication system according to the embodiment includes a management apparatus 1, a plurality of base stations 2, and a plurality of mobile stations 3. Each of the base stations 2 forms a cell and the cells formed by the base stations 2 overlap each other.

The base station 2 includes one or more antenna elements (transmission points). In the embodiment, the base station 2 includes any type of base station 2. For example, the base station may be an evolved node B (eNB) in LTE or may be a remote radio head (RRH). The base stations 2 and the mobile stations 3 are not limited to LTE and may perform communication in conformity to any communication schemes.

The mobile station 3 includes one or more antenna elements and communicates with the mobile station 3 using one or more antenna elements. The mobile station 3 may be referred to as a user equipment (UE) or may be referred to as a terminal.

The management apparatus 1 has a function of managing the base stations 2 and the mobile stations 3 and performs various kinds of control such that the plurality of base stations 2 cooperate to transmit and receive wireless signals. The management apparatus 1 may be referred to as central unit (CU), may be referred to as a key station, or may be referred to as an aggregate processing apparatus. The management apparatus 1 generates one or more clusters by grouping one or more transmission points used to communicate with the mobile stations 3. The management apparatus 1 performs control such that the mobile stations 3 continue communication by reconstructing the clusters with movement of the mobile stations 3. In the example of FIG. 5, clusters A to D are generated, but are merely examples. The number of generated clusters is not limited.

The management apparatus 1 allocates orthogonal reference signals to the plurality of transmission points that form one cluster. That is, the management apparatus 1 performs control such that the reference signals are in an orthogonal state in one cluster.

<Functional Configuration>

Figure 6:
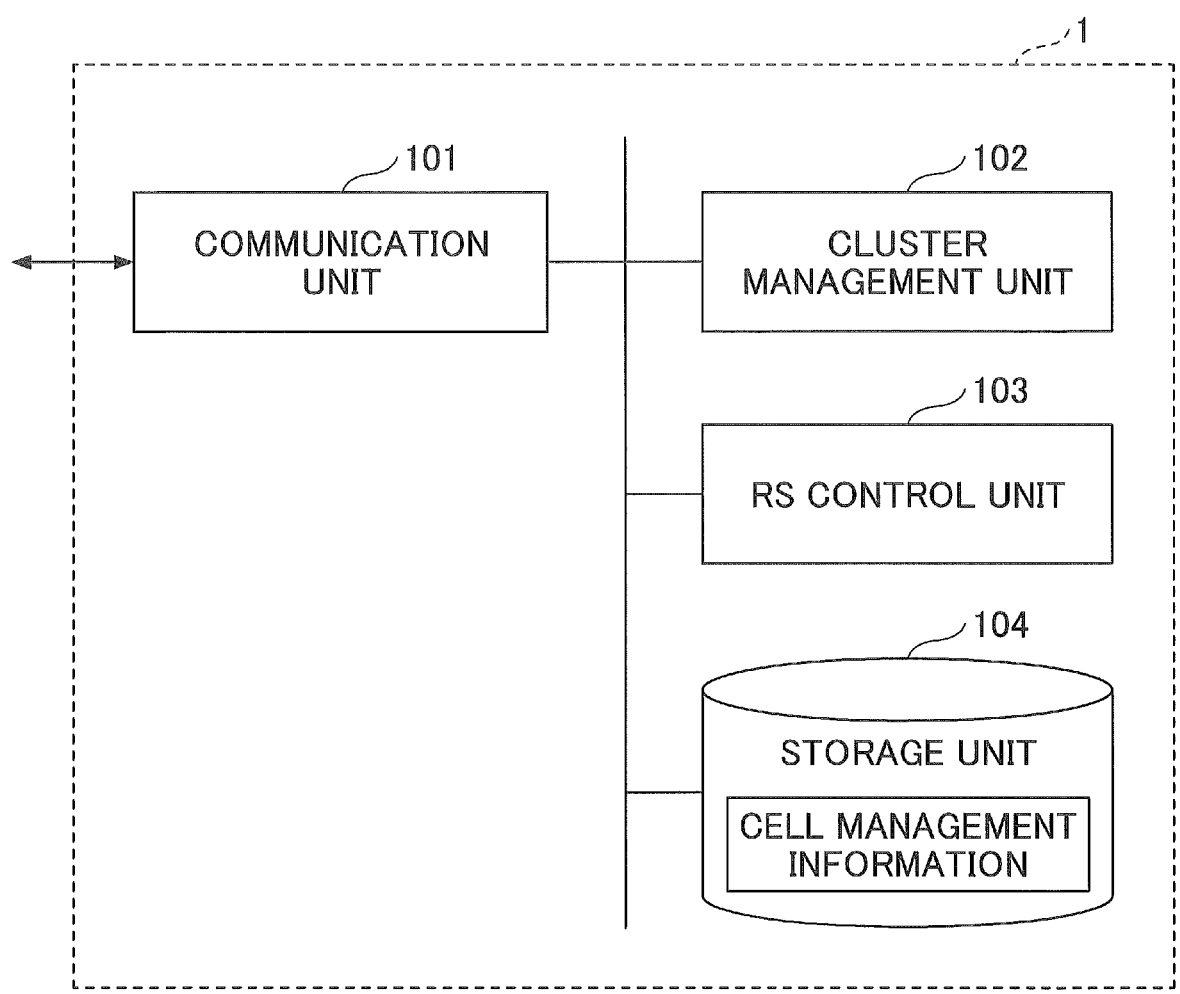
FIG. 6 is a diagram illustrating a functional configuration example of a management apparatus according to the embodiment.

FIG. 6 is a diagram illustrating a functional configuration example of a management apparatus according to the embodiment. As illustrated in FIG. 6, the management apparatus 1 includes a communication unit 101, a cluster management unit 102, a reference signal (RS) control unit 103, and a storage unit 104. FIG. 6 illustrates only main function units according to the embodiment, and thus functions (not illustrated) used to perform operations conforming to communication schemes used in the wireless communication system are also included. Here, some (for example, only one specific selection method or a plurality of specific selection method, a specific example, and a modification example) of the processes of the management apparatus 1 to be described in "<Processing Procedure>" to be described below may be able to be performed.

The communication unit 101 has a function of communicating with the base stations 2 and the mobile stations 3 in a wired or wireless manner.

The cluster management unit 102 has a function of generating a cluster (performing clustering) by grouping one or more transmission points used to communicate with the mobile stations 3 among the plurality of transmission points. The cluster management unit 102 has a function of changing the grouped transmission points (reconstructing clusters) when one or more transmission points used to communicate with the mobile stations 3 are changed due to movement or the like of the mobile stations 3. The cluster management unit 102 has a function of detecting that some of a plurality of cells formed by each cluster overlap each other.

The RS control unit 103 has a function of controlling allocation of the reference signals transmitted from one or more transmission points in the same cluster. The cluster management unit 102 has a function of allocating the orthogonal reference signals to the plurality of cells formed by each of the clusters in which the overlap is detected (that is, performing control such that interference of the reference signals does not occur in portions in which the cells overlap each other) when it is detected that some of the plurality of cells formed by each cluster overlap each other.

The storage unit 104 stores "cell management information" used to manage the overlap of the cells formed by the plurality of transmission points. In the cell management information, for example, information that associates the plurality of transmission points with one or more other transmission points forming the cells overlapping the cells formed by the plurality of transmission points is stored.

An example of the cell management information is illustrated in FIG. 7A and FIG. 7B. FIG. 7A illustrates a state in which cells formed by the plurality of transmission points overlap each other and FIG. 7B illustrates a specific example of the cell management information corresponding to the state illustrated in FIG. 7A. The cluster management unit 102 can determine whether the cells overlap between the clusters by referring to the cell management information when the clusters are generated and the clusters are reconstructed.

<Hardware Configuration>

Figure 8:
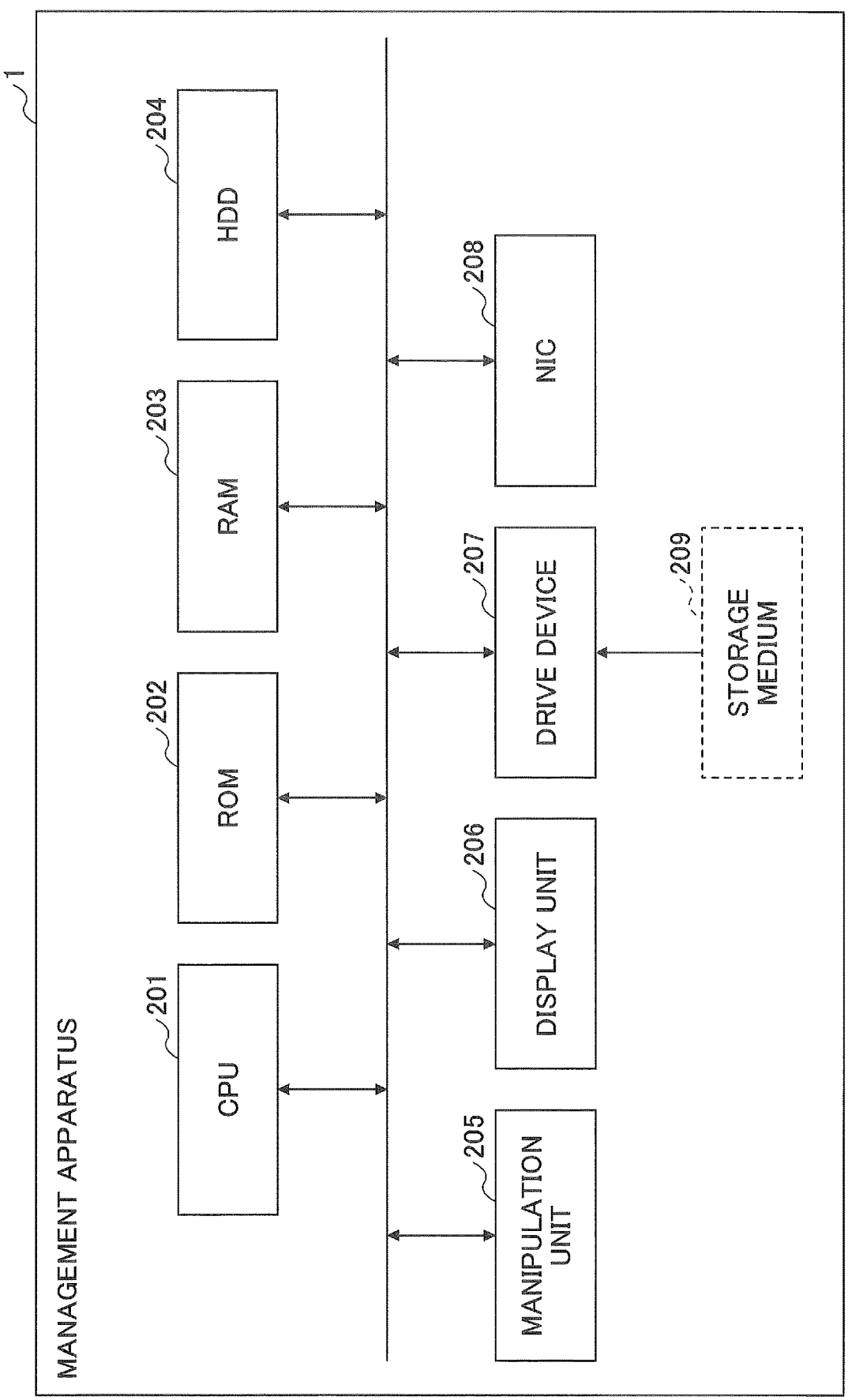
FIG. 8 is a diagram illustrating a hardware configuration example of the management apparatus according to the embodiment.

FIG. 8 is a diagram illustrating a hardware configuration example of the management apparatus according to the embodiment. The management apparatus 1 according to the embodiment includes a CPU 201, a ROM 202, a RAM 203, an HDD 204, a manipulation unit 205, a display unit 206, a drive device 207, and a network interface card (NIC) 208.

The CPU 201 is a processor that controls the entire management apparatus 1. The CPU 201 realizes various functions of the management apparatus 1 by executing an operating system, applications, and programs of various services stored in the HDD 204 or the like. The ROM 202 stores various programs and data or the like used by the programs. The RAM 203 is used as a storage region to which a program is loaded or a work area of the loaded program. The HDD 204 stores various kinds of information, programs, and the like.

The manipulation unit 205 is hardware that receives an input manipulation from a user and is, for example, a keyboard or a mouse. The display unit 206 is hardware that performs display for a user.

The drive device 207 reads a program from a storage medium 209 that records a program. The program read by the drive device 207 is installed in, for example, the HDD 204. The NIC 208 is a communication interface that connects the management apparatus 1 to a network to transmit and receive data.

The storage medium 209 is a non-transitory storage medium. Examples of the storage medium 209 include a magnetic storage medium, an optical disc, a magneto-optical storage medium, and a nonvolatile memory.

<Processing Procedure>

Next, a processing procedure performed by the wireless communication system according to the embodiment will be described specifically.

(Generation and Reconstruction of Clusters)

The cluster management unit 102 of the management apparatus 1 generates a cluster by grouping one or more transmission points used to communicate with the mobile station 3. More specifically, the cluster management unit 102 generates a cluster so that the number of transmission points grouped in one cluster is basically equal to or less than the number of orthogonal reference signals in the wireless communication system (the number of orthogonal reference signal usable in the wireless communication system) in order that interference of the reference signals does not occur between clusters. For example, when the number of orthogonal reference signals usable in the wireless communication system is 16, the cluster management unit 102 groups the number of transmission points equal to or less than 16 in one cluster.

When the transmission points used to communicate with the mobile station 3 is changed due to movement of the mobile station 3 or an increase or decrease in the number of mobile stations 3, the cluster management unit 102 changes the transmission points to be regrouped (reconstructs the clusters).

In order to generate and reconstruct the clusters, it is necessary for the cluster management unit 102 to ascertain the transmission points which are the transmission points used to communicate with the mobile station 3 among the plurality of transmission points present in the wireless communication system. For example, the cluster management unit 102 may determine that the transmission point receiving uplink reference signals transmitted from the mobile station 3 is the transmission point used to communicate with the mobile station 3 or may determine that the transmission point for which reception power of one wireless signal transmitted from the mobile station 3 is equal to or greater than a predetermined threshold is the transmission point used to communicate with the mobile station 3.

(Suppression of Interference of Reference Signals)

Next, an example of a processing procedure performed to prevent interference of the reference signals by the management apparatus 1 at the time of generating or reconstructing the clusters will be described. In the following description, a case in which the clusters are reconstructed with movement or the like of the mobile station 3 will be described as an example. The following processing procedure can also be applied similarly to a case in which a new cluster is generated.

[Example of Processing Procedure (Part 1)]

In an example of the processing procedure (part 1), when it is assumed that the cells formed by the reconstructed cluster overlap some of the cells formed by another cluster at the time of reconstructing the clusters, the cluster management unit 102 performs control such that the cells formed by two clusters do not overlap each other by deleting the transmission points that form one of the clusters (that is, by decreasing the cluster).

More specifically, the cluster management unit 102 determines whether the overlap with the cell formed by one transmission point grouped in another previously generated cluster occurs by retrieving the cell management information using each of the plurality of transmission points scheduled to be grouped in a reconstructed cluster as a key. When the cluster management unit 102 determines that the overlap occurs, the cluster management unit 102 performs control such that the overlap between the cells formed by two clusters does not occur by deleting the transmission point that forms the cell in which the overlap occurs in one of the reconstructed cluster and the other cluster.

Figure 9A:
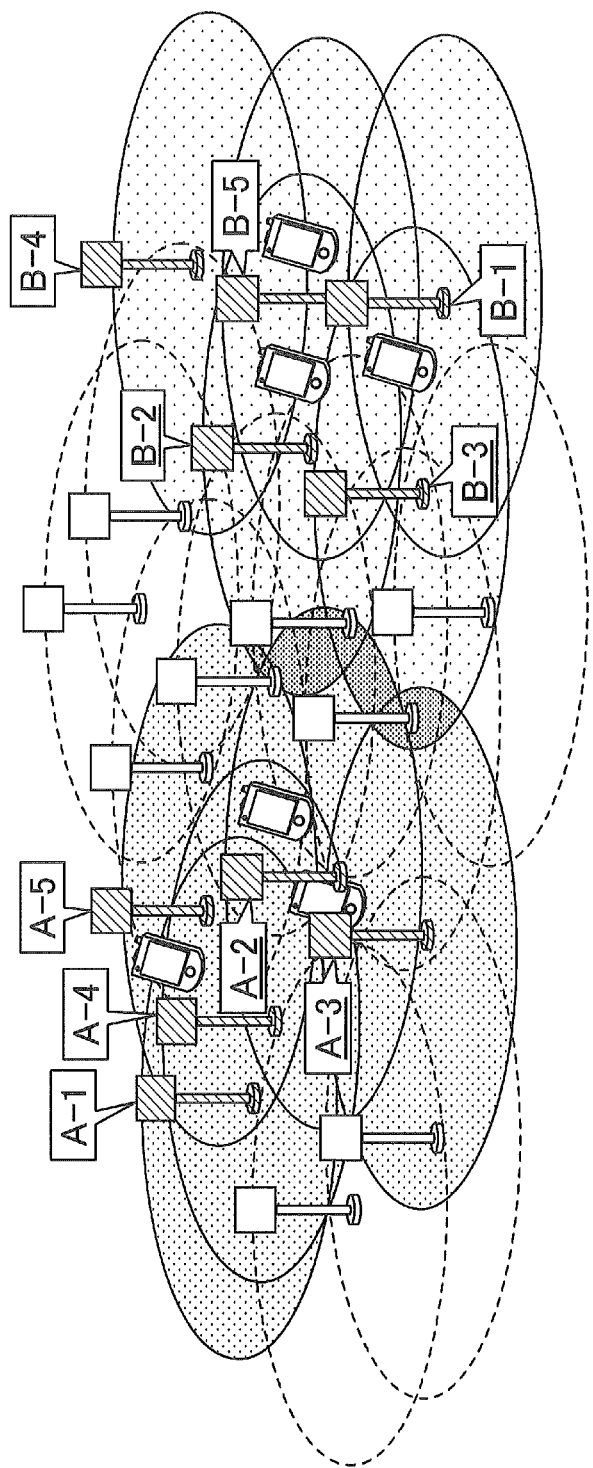
FIG. 9A is a diagram for describing an example (part 1) of a processing procedure.

FIG. 9A and FIG. 9B are diagrams for describing an example (part 1) of a processing procedure. In FIG. 9A and FIG. 9B, the transmission points to which "A-1," "A-2," "A-3," "A-4," and "A-5" are given indicate transmission points grouped in a cluster A. Similarly, the transmission points to which "B-1," "B-2," "B-3," "B-4," and "B-5" are given indicate transmission points grouped in a cluster B. In the example of FIG. 9A and FIG. 9B, it is assumed that 5 orthogonal reference signals (number 1 to number 5) can be used in the wireless communication system. Here, "1" of "A-1" means a numeral of a reference signal. That is, the transmission point "A-1" means a transmission point that transmits a reference signal of "number 1" grouped in the cluster A. The numeral of the reference signal is given to facilitate the description and does not intend a specific series or the like.

For example, it is assumed that as a reconstruction result of the clusters, as illustrated in FIG. 9A, the cells formed by the transmission points "A-2" and "A-3" grouped in the cluster A overlap the cells formed by the transmission points "B-2" and "B-3" grouped in the cluster B. In this case, the reference signal of number 2 transmitted from the transmission point "A-2" interferes with the reference signal of number 2 transmitted from the transmission point "B-2."

Accordingly, the cluster management unit 102 deletes the transmission points "A-2" and "A-3" grouped in the cluster A or the transmission points "B-2" and "B-3" grouped in the cluster B (excludes the transmission points as grouping targets) at the time of reconstructing the clusters. Thus, it is possible to perform control such that the cells formed by the clusters A and B do not overlap each other. Thus, it is possible to suppress interference occurrence of the reference signals. The example of FIG. 9B indicates a case in which the transmission points "B-2" and "B-3" grouped in the cluster B are deleted.

The cluster management unit 102 may decide the cluster in which the transmission points are deleted (the cluster A or B in the example of FIG. 9A and FIG. 9B) based on a traffic amount of communication performed between the mobile station 3 and the transmission point when the cluster management unit 102 deletes the transmission points. For example, the cluster management unit 102 may delete the transmission points of the cluster in which the traffic amount is small. The cluster management unit 102 may decide the cluster in which the transmission points are deleted based on the number of mobile stations 3 present in the cluster. For example, the cluster management unit 102 may delete the transmission points of the cluster in which the number of mobile stations 3 is small.

[Example of Processing Procedure (Part 2)]

In an example of the processing procedure (part 1), by reconstructing the clusters, the management apparatus 1 deletes the transmission points without allowing the overlap of the cells when it is assumed that some of the cells formed by two clusters overlap each other. In the example of the processing procedure (part 2), however, by reconstructing the clusters, the management apparatus 1 performs control such that the reference signals are orthogonal in all the plurality of cells formed by two clusters while allowing the overlap of the cells when it is assumed that some of the cells formed by two clusters overlap each other.

For example, by reconstructing clusters, the RS control unit 103 of the management apparatus 1 may perform control such that the reference signals are orthogonal in all the cells formed by two clusters by interchanging the reference signals allocated to the transmission points that form the overlapped cells with the reference signals allocated to the transmission points that form the non-overlapped cells in any one cluster when some of the cells formed by two clusters overlap each other and the same reference signals are allocated between the overlapped cells.

Figure 10A:
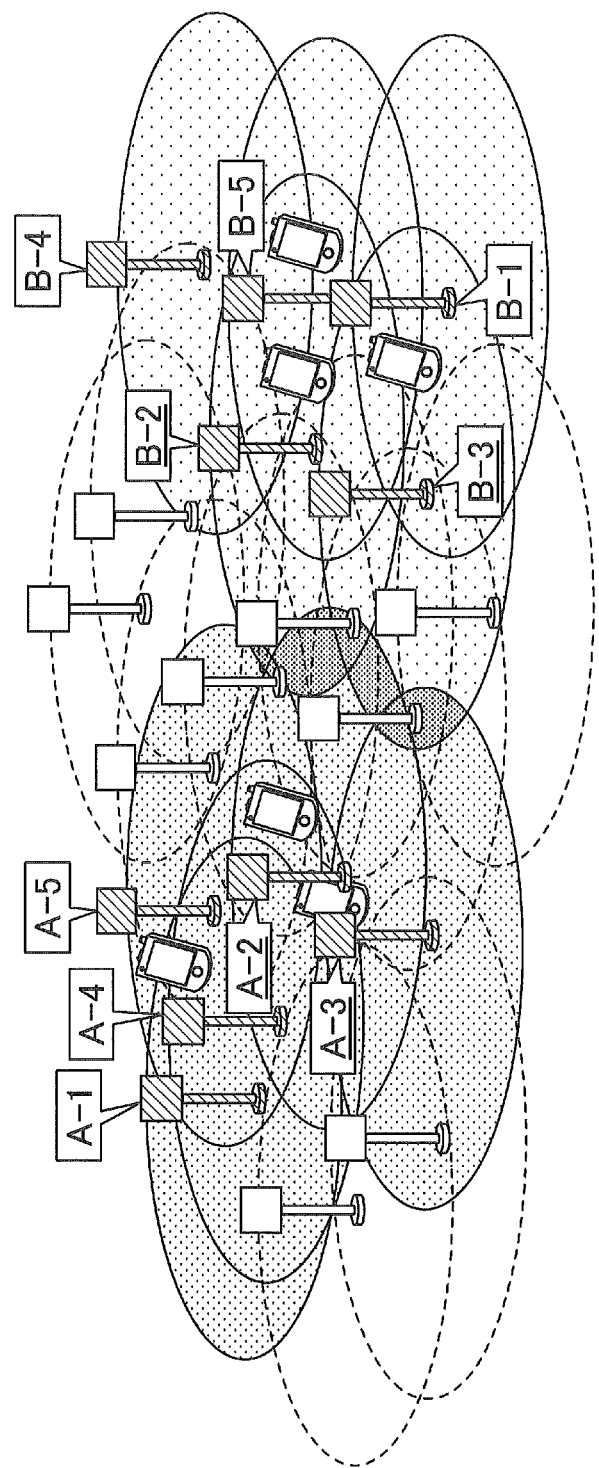
FIG. 10A is a diagram for describing an example (part 2) of the processing procedure.
Figure 10B:
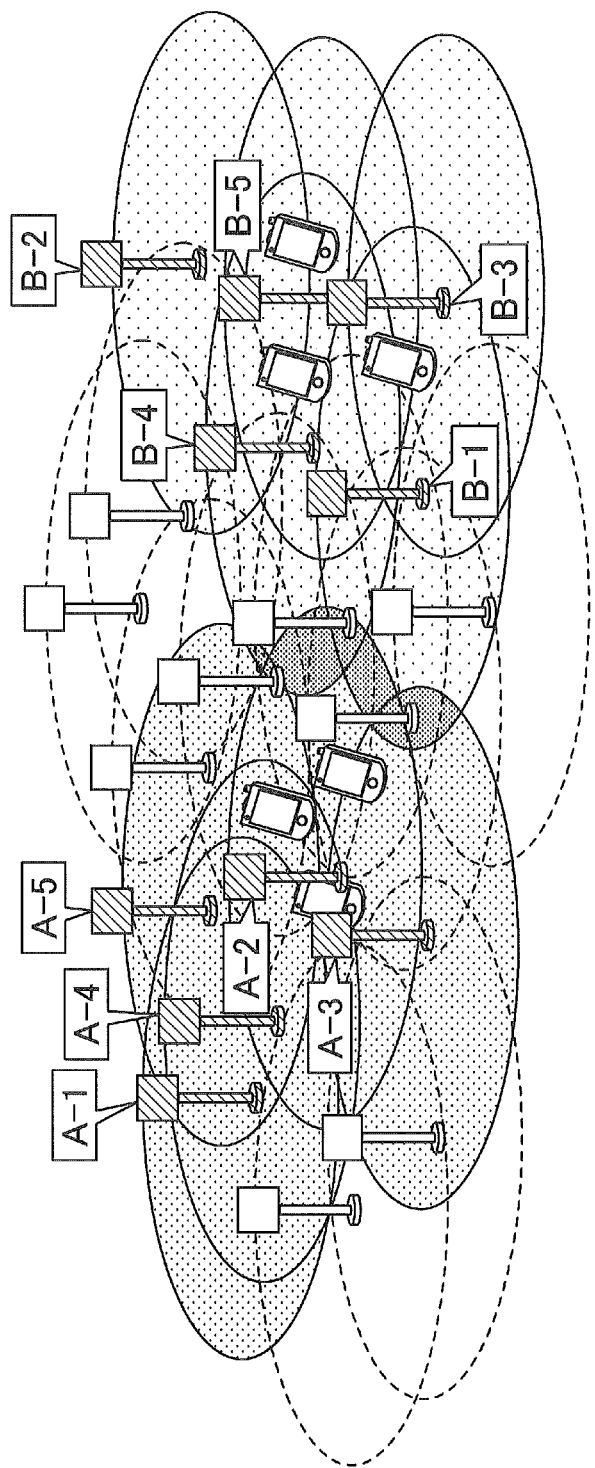
FIG. 10B is a diagram for describing an example (part 2) of the processing procedure.

FIG. 10A and FIG. 10B are diagrams for describing an example (part 2) of the processing procedure. Points which are not particularly mentioned in FIG. 10A and FIG. 10B are the same as those of FIG. 9A and FIG. 9B.

For example, as illustrated in FIG. 10A, when the cluster A is reconstructed, it is assumed that the cells formed by the transmission points "A-2" and "A-3" grouped in the cluster A and the transmission points "B-2" and "B-3" grouped in the cluster B overlap each other. When the cluster A is reconstructed as in FIG. 10A, the reference signal of "number 2" transmitted from the transmission point "A-2" interferes with the reference signal of "number 2" transmitted from the transmission point "B-2" in a location in which the cells overlap each other. Similarly, the reference signal of "number 3" transmitted from the transmission point "A-3" interferes with the reference signal of "number 3" transmitted from the transmission point "B-3" in a location in which the cells overlap each other.

In this case, for example, the RS control unit 103 interchanges the reference signal transmitted by the transmission point "B-2" grouped in the cluster B with the reference signal transmitted by the transmission point "B-4" (or which may be "B-1" or "B-5") which does not overlap the cell formed by the cluster A. Similarly, the cluster management unit 102 interchanges the reference signal transmitted by the transmission point "B-3" grouped in the cluster B with the reference signal transmitted by the transmission point "B-1" (or which may be "B-4" or "B-5") which does not overlap the cell formed by the cluster A. The example of FIG. 10B illustrates a state after the reference signals of the transmission points "B-2" and "B-3" grouped in the cluster B are interchanged.

When the cluster management unit 102 interchanges the reference signals transmitted by the transmission points, the cluster management unit 102 may decide a cluster in which the transmission points are interchanged (in the example of FIG. 10A and FIG. 10B, the cluster A or B) based on a traffic amount of communication performed between the mobile stations 3 and the transmission points. For example, the cluster management unit 102 may interchange the transmission points of the cluster in which the traffic amount is small. Based on the number of mobile stations 3 present in the cluster, the cluster management unit 102 may decide the cluster in which the transmission points are interchanged. For example, the cluster management unit 102 may interchange the transmission points of the cluster in which the number of mobile stations 3 is small.

[Example of Processing Procedure (Part 3)]

In the example of the processing procedure (part 1) and the example of the processing procedure (part 2), one transmission point is grouped in only one cluster. However, when the clusters are reconstructed, it is assumed that one transmission point is preferably grouped in a plurality of clusters, depending on positions or the like to which the mobile stations 3 are to move. Accordingly, in the example of the processing procedure (part 3), the management apparatus 1 allows one transmission point to be grouped in a plurality of clusters and performs control such that the reference signals are orthogonal in cells in which the transmission points grouped in the plurality of clusters are formed and cells in which the transmission points grouped in only one group are formed.

More specifically, in the example of the processing procedure (part 3), the cluster management unit 102 groups two clusters so that some of the transmission points grouped in one cluster are identical with some of the transmission points grouped in the other cluster when the cluster management unit 102 reconstructs the clusters.

The RS control unit 103 allocates the reference signals so that the reference signals are orthogonal in the cells in which the transmission points are grouped in only one cluster, the cells in which the transmission points are grouped in only the other cluster, and the cells in which the transmission points are grouped in both the clusters.

Figure 11A:
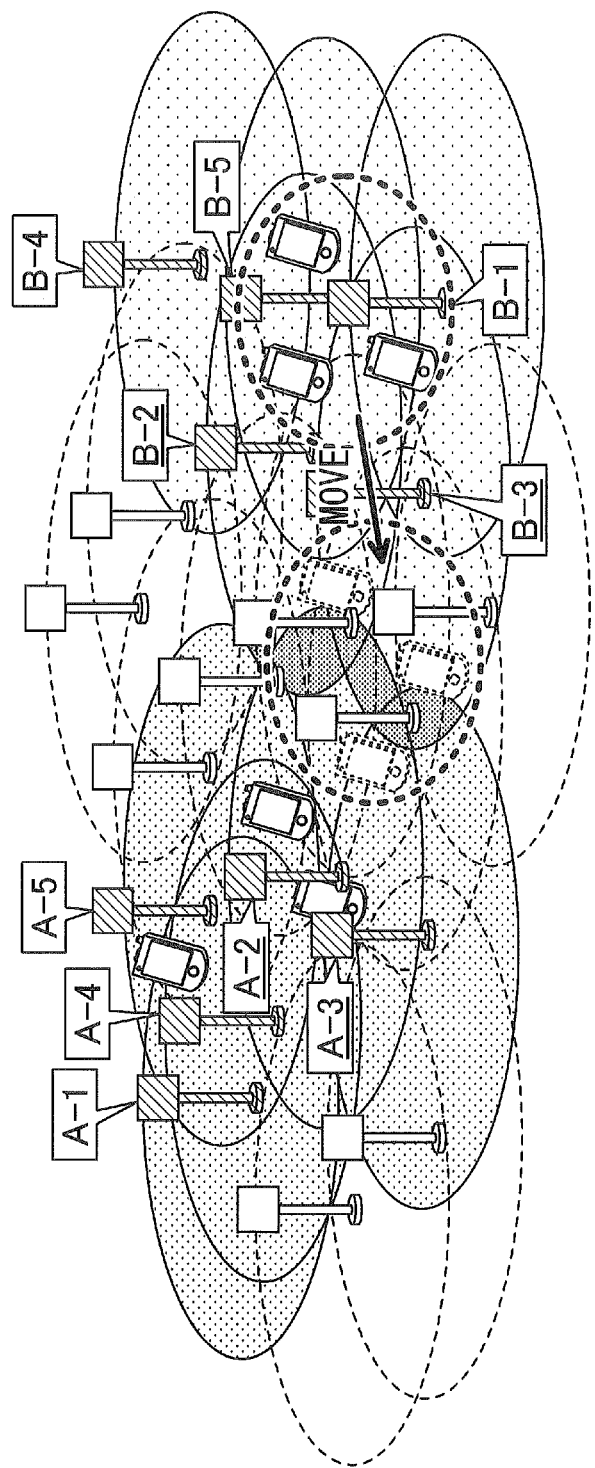
FIG. 11A is a diagram for describing an example (part 3) of the processing procedure.
Figure 11B:
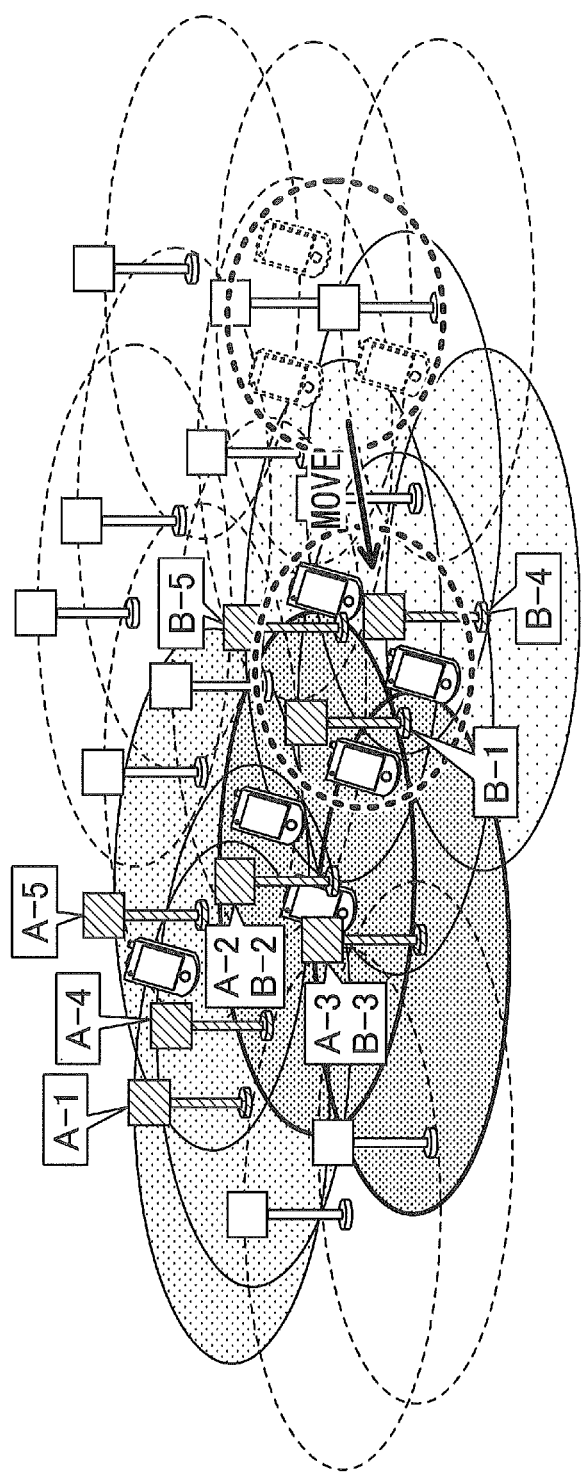
FIG. 11B is a diagram for describing an example (part 3) of the processing procedure.

FIG. 11A and FIG. 11B are diagrams for describing an example of the processing procedure (part 3). Points which are not particularly mentioned in FIG. 11A and FIG. 11B are the same as those of FIG. 9A and FIG. 9B.

For example, in a state illustrated in FIG. 11A, for example, a situation in which it is necessary to reconstruct the cluster B is assumed since the mobile station 3 present in the cluster B has further moved in the direction of the cluster A. In this case, as illustrated in FIG. 11B, the cluster management unit 102 groups the transmission points "A-2" and "A-3" of the cluster A as transmission points ("A-2 and B-2" and "A-3 and B-3") of the clusters A and B.

The RS control unit 103 allocates the reference signals so that the reference signals are orthogonal in the cells in which the transmission points grouped in only the cluster A, the cells in which the transmission points grouped in only the cluster B, and the cells in which the transmission points grouped in both the clusters A and B. For example, the RS control unit 103 first allocates the reference signals to the transmission points grouped in both the clusters. In an example of FIG. 11B, the RS control unit 103 allocates the reference signals of numbers 2 and 3 to the transmission points ("A-2 and B-2" and "A-3 and B-3"). Subsequently, the RS control unit 103 selects the remaining reference signals and allocates the selected reference signals to the transmission points in which the cells do not overlap each other among the transmission points grouped in only the cluster A and the transmission points grouped in only the cluster B. In the example of FIG. 11B, the RS control unit 103 allocates the reference signal of number 1 to the transmission points "A-1" and "B-1," allocates the reference signal of number 4 to the transmission points "A-4" and "B-4," and allocates the reference signal of number 5 to the transmission points "A-5" and "B-5."

When the cluster management unit 102 reconstructs the clusters, the cluster management unit 102 may group the transmission points so that a sum of the number of transmission points grouped in only one cluster, the number of transmission points grouped in only the other cluster, and the number of transmission points grouped in both the clusters is equal to or less than the number of orthogonal reference signals in the wireless communication system. In this case, the number of reference signals necessary for the allocation to the transmission points is equal to or less than the number of orthogonal reference signals in the wireless communication system. That is, since the reference signals are necessarily orthogonal between two clusters, the RS control unit 103 can allocate any reference signal to any transmission point without considering interference of the reference signals.

[Supplements]

The example of each processing procedure described above can also be applied even when the cells of three or more clusters overlap each other. For example, in the example of the processing procedure (part 3), one transmission point can also be grouped in three or more clusters.

<Conclusion>

According to an embodiment, as described above, there is provided a management apparatus in a wireless communication system that includes a plurality of transmission points transmitting reference signals, the management apparatus managing the plurality of transmission points, and a mobile station. The management apparatus includes: a management unit configured to manage first and second clusters generated by grouping one or more transmission points used to communicate with the mobile station among the plurality of transmission points; and a control unit configured to control allocation of the reference signals transmitted from the plurality of transmission points in the first and second clusters. The management unit detects that a plurality of cells formed by the transmission points in the first cluster overlap some of a plurality of cells formed by the transmission points in the second cluster. When the management unit detects the overlap, the control unit allocates the orthogonal reference signals to the plurality of cells formed by the transmission points in the first cluster and the plurality of cells formed by the transmission points in the second cluster. In the management apparatus 1, there is provided a technology capable of suppressing interference of the reference signals in the wireless communication system including the plurality of transmission points.

The management apparatus may further include a storage unit configured to store cell management information managing the overlap of the cells formed by the plurality of transmission points. When the transmission points grouped in the first cluster or the transmission points grouped in the second cluster are changed, the management unit may detect that the plurality of cells formed by the transmission points in the first cluster overlap some of the plurality of cells formed by the transmission points in the second cluster based on the cell management information. The management apparatus 1 can detect the overlap of the cells between the clusters more accurately. Even when a new transmission point is added, the management apparatus 1 can detect the overlap of the cells in consideration of a cell formed by the new transmission point by updating the cell management information.

When the management unit detects that the plurality of cells formed by the transmission points in the first cluster overlap some of the plurality of cells formed by the transmission points in the second cluster, the management unit may delete the transmission points forming the overlapped cells among the transmission points grouped in the second cluster from the second cluster. Thus, the management apparatus 1 can perform control such that the cells between the clusters do not overlap each other, and thus can suppress the interference of the reference signals.

When the reference signals allocated to the transmission points forming the cells overlapped in the first cluster are identical with the reference signals allocated to the transmission points forming the cells overlapped in the second cluster, the control unit may interchange the reference signals allocated to the transmission points forming the cells overlapped in the second cluster with the reference signals allocated to the transmission points forming the cells not overlapped in the second cluster. Thus, the management apparatus 1 can suppress the interference of the reference signals while allowing the overlap of the cells between the clusters.

The management unit may group the first and second clusters so that some of the transmission points grouped in the first cluster are identical with some of the transmission points grouped in the second cluster. The control unit may allocate the orthogonal reference signals to the cells formed by the transmission points grouped in only the first cluster, the cells formed by the transmission points grouped in only the second cluster, and cells formed by the transmission points grouped in both the first and second clusters. Thus, the management apparatus 1 can share the transmission points between the plurality of clusters and can cluster the transmission points more flexibly.

The number of transmission points grouped in the first and second clusters may be equal to or less than the number of reference signals allocable as the orthogonal reference signals in the wireless communication system. Thus, it is possible to suppress the interference of the reference signals in the cluster.

<Supplements of Embodiment>

As described above, the configuration of each apparatus (the management apparatus 1/the base station 2/the mobile station 3) described in the embodiment may be a configuration realized when a program is executed by a CPU (processor) in the apparatus including the CPU and a memory, may be a configuration realized by hardware such as a hardware circuit having a process logic described in the embodiment, or may be a configuration in which a program and hardware are mixed.

The embodiments of the invention have been described above, but the disclosed invention is not limited to the embodiments. Those skilled in the art can understand various modifications, corrections, substitutions, replacements, and the like. To promote understanding of the invention, the description has been made using examples of specific numerical values. These numerical values are merely examples and any appropriate values may be used unless otherwise stated. The classification of the items in the foregoing description are not fundamental, but matters described in two or more items may be combined to be used as necessary or matters described in any item may be applied to matters described in other items (unless the matters are inconsistent). The boundaries of the functional units or the processing units in the functional block diagrams may not necessarily correspond to the boundaries of physical components. Operations of the plurality of functional units may be performed physically by one component or an operation of one functional unit may be performed physically by a plurality of components. The procedures of the sequences and the flowcharts described in the embodiments may be switched in a procedure without being inconsistent. To facilitate the description of the processes, the management apparatus 1/the base station 2/the mobile station 3 have been described with reference to the functional block diagrams, but the devices may be realized hardware, software, or a combination thereof. Software operated by the processor included in the management apparatus 1 according to the embodiments of the invention, software operated by the processor included in the base station 2 according to the embodiments of the invention, and software operated by the processor included in the mobile station 3 according to the embodiments of the invention may each be stored in any appropriate storage medium such as a random access memory (RAM), a flash memory, a read-only memory (ROM), an EPROM, an EEPROM, a register, a hard disk (HDD), a removable disk, a CD-ROM, a database, and a server.

Information transmission (notification, reporting) may be performed not only by methods described in an aspect/embodiment of the present specification but also a method other than those described in an aspect/embodiment of the present specification. For example, the information transmission may be performed by physical layer signaling (e.g., DCI (Downlink Control Information), UCI (Uplink Control Information)), upper layer signaling (e.g., RRC signaling, MAC signaling, broadcast information (MIB (Master Information Block), SIB (System Information Block))), other signals, or combinations thereof. Further, an RRC message may be referred to as RRC signaling. Further, an RRC message may be, for example, an RRC connection setup message, an RRC connection reconfiguration message, or the like.

An aspect/embodiment described in the present specification may be applied to a system that uses LTE (Long Term Evolution), LTE-A (LTE-Advanced), SUPER 3G, IMT-Advanced, 4G, 5G, FRA (Future Radio Access), W-CDMA (registered trademark), GSM (registered trademark), CDMA2000, UMB (Ultra Mobile Broadband), IEEE 802.11 (Wi-Fi), IEEE 802.16 (WiMAX), IEEE 802.20, UWB (Ultra-WideBand), Bluetooth (registered trademark), other appropriate systems, and/or a next generation system enhanced based thereon.

Determination or judgment may be performed according to a value (0 or 1) represented by a bit, may be performed according to a boolean value (true or false), or may be performed according to comparison of numerical values (e.g., comparison with a predetermined value).

It should be noted that the terms described in the present specification and/or terms necessary for understanding the present specification may be replaced by terms that have the same or similar meaning. For example, a channel and/or a symbol may be a signal. Further, a signal may be a message.

There is a case in which a UE may be referred to as a subscriber station, a mobile unit, subscriber unit, a wireless unit, a remote unit, a mobile device, a wireless device, a wireless communication device, a remote device, a mobile subscriber station, an access terminal, a mobile terminal, a wireless terminal, a remote terminal, a handset, a user agent, a mobile client, a client, or some other appropriate terms.

An aspect/embodiment described in the present specification may be used independently, may be used in combination, or may be used by switching according to operations. Further, transmission of predetermined information (e.g., transmission of "it is X") is not limited to explicitly-performed transmission. The transmission of predetermined information may be performed implicitly (e.g., explicit transmission of predetermined information is not performed).

As used herein, the term "determining" may encompasses a wide variety of actions. For example, "determining" may be regarded as calculating, computing, processing, deriving, investigating, looking up (e.g., looking up in a table, a database or another data structure), ascertaining and the like. Also, "determining" may be regarded as receiving (e.g., receiving information), transmitting (e.g., transmitting information), inputting, outputting, accessing (e.g., accessing data in a memory) and the like. Also, "determining" may be regarded as resolving, selecting, choosing, establishing, comparing and the like. That is, "determining" may be regarded as a certain type of action related to determining.

As used herein, the phrase "based on" does not mean, unless otherwise noted, "based on only". In other words, the phrase "base on" means both "based on only" and "based on at least".

Also, the order of processing steps, sequences or the like of an aspect/embodiment described in the present specification may be changed as long as there is no contradiction. For example, in a method described in the present specification, elements of various steps are presented in an exemplary order. The order is not limited to the presented specific order.

Input/output information, etc., may be stored in a specific place (e.g., memory) or may be stored in a management table. The input/output information, etc., may be overwritten, updated, or added. Output information, etc., may be deleted. Input information, etc., may be transmitted to another apparatus.

Transmission of predetermined information (e.g., transmission of "it is X") is not limited to explicitly-performed transmission. The transmission of predetermined information may be performed implicitly (e.g., explicit transmission of predetermined information is not performed).

Information, a signal, etc., described in the present specification may be represented by using any one of the various different techniques. For example, data, an instruction, a command, information, a signal, a bit, a symbol, a chip or the like described throughout in the present specification may be represented by voltage, current, electromagnetic waves, magnetic fields or a magnetic particle, optical fields or a photon, or any combination thereof.

The present invention is not limited to the above embodiments and various variations, modifications, alternatives, replacements, etc., may be included in the present invention without departing from the spirit of the invention.

The present application is based on and claims the benefit of priority of Japanese Priority Application No. 2016-048753 filed on Mar. 11, 2016, the entire contents of which are hereby incorporated by reference.

EXPLANATIONS OF LETTERS OR NUMERALS

1 management apparatus
2 base station
3 mobile station
101 communication unit
102 cluster management unit
103 RS control unit
104 storage unit

The invention claimed is:

1. A management apparatus in a wireless communication system that includes a plurality of transmission points transmitting reference signals, the management apparatus managing the plurality of transmission points, and a mobile station, the management apparatus comprising:
   a processor that manages first and second clusters generated by grouping one or more transmission points used to communicate with the mobile station among the plurality of transmission points;
   a transmitter coupled to the processor for controlling allocation of the reference signals transmitted from the plurality of transmission points in the first and second clusters; and
   a memory that stores cell management information managing the overlap of the cells formed by the plurality of transmission points,
   wherein the processor detects that a plurality of cells formed by the transmission points in the first cluster overlap some of a plurality of cells formed by the transmission points in the second cluster,
   wherein when the processor detects the overlap, the transmitter and the processor allocate orthogonal reference signals to both the plurality of cells formed by the transmission points in the first cluster and the plurality of cells formed by the transmission points in the second cluster, and
   wherein when the first cluster or the second cluster are reconstructed to change the transmission points in the first cluster or the transmission points in the second cluster, the processor detects that the plurality of cells formed by the transmission points in the first cluster overlap some of the plurality of cells formed by the transmission points in the second cluster based on the cell management information.

2. The management apparatus according to claim 1, wherein when the processor detects that the plurality of cells formed by the transmission points in the first cluster overlap some of the plurality of cells formed by the transmission points in the second cluster, the processor deletes the transmission points forming the overlapped cells among the transmission points grouped in the second cluster from the second cluster.

3. The management apparatus according to claim 1, wherein the plurality of cells formed by the transmission points in the second cluster comprise cells overlapped and cells not overlapped, and
   wherein when the reference signals allocated to the transmission points forming the cells overlapped in the first cluster are identical with the reference signals allocated to the transmission points forming the cells overlapped in the second cluster, the transmitter and the processor interchange the reference signals allocated to the transmission points forming the cells overlapped in the second cluster with the reference signals allocated to the transmission points forming the cells not overlapped in the second cluster.

4. The management apparatus according to claim 1, wherein the processor groups the first and second clusters so that some of the transmission points grouped in the first cluster are identical with some of the transmission points grouped in the second cluster, and
   wherein the transmitter and the processor allocate the orthogonal reference signals to the cells formed by the transmission points grouped in only the first cluster, the cells formed by the transmission points grouped in only the second cluster, and cells formed by the transmission points grouped in both the first and second clusters.

5. The management apparatus according to claim 1, wherein the number of transmission points grouped in the first and second clusters is equal to or less than the number of reference signals allocable as the orthogonal reference signals in the wireless communication system.

6. The management apparatus according to claim 2, wherein the number of transmission points grouped in the first and second clusters is equal to or less than the number of reference signals allocable as the orthogonal reference signals in the wireless communication system.

7. The management apparatus according to claim 3, wherein the number of transmission points grouped in the first and second clusters is equal to or less than the number of reference signals allocable as the orthogonal reference signals in the wireless communication system.

8. The management apparatus according to claim 4, wherein the number of transmission points grouped in the first and second clusters is equal to or less than the number of reference signals allocable as the orthogonal reference signals in the wireless communication system.

* * * * *